US008056808B2

(12) United States Patent
Epshteyn

(10) Patent No.: US 8,056,808 B2
(45) Date of Patent: Nov. 15, 2011

(54) ARRANGEMENT FOR AND METHOD OF CONTROLLING IMAGE CAPTURE PARAMETERS IN RESPONSE TO MOTION OF AN IMAGING READER

(75) Inventor: Alan Epshteyn, New York, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 430 days.

(21) Appl. No.: 12/286,079

(22) Filed: Sep. 26, 2008

(65) Prior Publication Data

US 2010/0078479 A1  Apr. 1, 2010

(51) Int. Cl.
G06K 7/10 (2006.01)
G06K 9/00 (2006.01)
(52) U.S. Cl. .......... 235/462.17; 235/462.24; 235/462.41
(58) Field of Classification Search ............. 235/462.17, 235/462.24, 462.29, 462.41, 462.1
See application file for complete search history.

(56) References Cited

U.S. PATENT DOCUMENTS

| 4,613,895 | A | 9/1986 | Burkey et al. |
| 4,794,239 | A | 12/1988 | Allais |
| 5,304,786 | A | 4/1994 | Pavlidis et al. |
| 5,703,349 | A | 12/1997 | Meyerson et al. |
| 2007/0057067 | A1 | 3/2007 | He |
| 2008/0101786 | A1 | 5/2008 | Pozniansky et al. |

OTHER PUBLICATIONS

International Search and Written Opinion of the International Searching Authority mailed Nov. 12, 2009.

Primary Examiner — Edwyn Labaze

(57) ABSTRACT

An arrangement for, and a method of, reducing image blur in response to motion of an imaging reader for imaging symbols to be read, employs an illuminating light assembly supported by the reader for illuminating a symbol with illumination light having an intensity level over an illumination time period, a solid-state imager supported by the reader and having an array of image sensors for capturing return light from the symbol over a field of view over an exposure time period, a motion sensor, such as a gyroscope or an accelerometer, supported by the reader for detecting the motion of the reader, and for generating a motion signal in response to the detected motion of the reader, and a controller operatively connected to the motion sensor, for dynamically controlling at least one of the time periods and the intensity level in real time in response to the motion signal to optimally image the symbol.

14 Claims, 1 Drawing Sheet

ARRANGEMENT FOR AND METHOD OF CONTROLLING IMAGE CAPTURE PARAMETERS IN RESPONSE TO MOTION OF AN IMAGING READER

DESCRIPTION OF THE RELATED ART

Solid-state imaging systems or imaging readers, as well as moving laser beam readers or laser scanners, have both been used to electro-optically read targets, such as one-dimensional bar code symbols, particularly of the Universal Product Code (UPC) type, each having a row of bars and spaces spaced apart along one direction, as well as two-dimensional symbols, such as Code 49, which introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes an imaging module having a solid-state imager with a sensor array of cells or photosensors, which correspond to image elements or pixels in a field of view of the imager, and an imaging lens assembly for capturing return light scattered and/or reflected from the symbol being imaged, and for projecting the return light onto the sensor array to initiate capture of an image of the symbol. Such an imager may include a one- or two-dimensional charge coupled device (CCD) or a complementary metal oxide semiconductor (CMOS) device and associated circuits for producing and processing electronic signals corresponding to a one- or two-dimensional array of pixel information over the field of view. The imager captures the return light over an exposure time period under the control of a controller that is also operative for processing the electrical signals into data indicative of the symbol being imaged and read.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

In order to increase the amount of the return light captured by the imager, especially in dimly lit environments and/or at far range reading, the imaging reader generally also includes an illuminating light assembly, also under control of the controller, for illuminating the symbol with illumination light for reflection and scattering therefrom. The illumination is preferably pulsed for an illumination time period that is in synchronism with the exposure time period, but can also be continuous.

Yet, the use of an imaging reader, especially a handheld movable reader, for reading symbols located anywhere within a range of working distances relative to the reader has proven to be challenging. An operator cannot see exactly whether a symbol is within the field of view of the array during reading for optimum reading within the working range. It is not uncommon for the operator to repeatedly move the portable reader in multiple side-to-side, up-and-down, and back-and-forth, directions and repeatedly aim the portable reader at a single symbol several times before an indicator advises the operator that the symbol has been successfully imaged and read, thereby slowing down transaction processing and reducing productivity.

Such operator movement, including the ever present shake or jitter imparted to the portable reader by the operator's hand, especially pronounced when the handheld reader is small and light in weight, blurs the captured image and can prevent the symbol from being successfully read. The longer the exposure time period, the greater the degree of image blur will be present. To minimize the degree of image blur, the reader can be preset with fixed image capture parameter values set in advance to try and reduce the effects of such motion in most situations. Thus, the exposure time period and/or the illumination time period can each be preset to fixed short times and/or the illumination can be set to a fixed, very bright intensity level.

As advantageous as such preset parameter values are in attempting to capture a blur-free image, they are not optimal or suitable for all operators, or for all applications. Compromises inevitably occur in the amount of noise and blur that can be tolerated in the image, as well as in the brightness and the depth of field of the image. Excessive hand jitter or hand motion by a particular operator cannot be taken into account in advance and can often result in noisy, blurred, dark images of short depth of field, which degrade reading performance of symbols, especially those of high density and located far from the reader.

SUMMARY OF THE INVENTION

One feature of the present invention resides, briefly stated, in an arrangement for reducing image blur in response to motion of an imaging reader for imaging symbols to be read. The arrangement includes an illuminating light assembly supported by the reader for illuminating a symbol with illumination light having an intensity level over an illumination time period. Preferably, the illuminating light assembly includes a light emitting diode (LED) for emitting the illumination light as a light pulse.

The arrangement further includes a solid-state imager supported by the reader and having an array of image sensors for capturing return light from the symbol over a field of view over an exposure time period. Preferably, the imager is a CCD or a CMOS with a rolling or a global shutter. The array may be one-dimensional, i.e., linear arranged along a single row, or two-dimensional having mutually orthogonal multiple rows and columns.

The arrangement yet further includes a motion sensor supported by the reader for detecting the motion of the reader, and for generating a motion signal in response to the detected motion of the reader. Preferably, the motion sensor is an accelerometer, a gyroscope, or an analogous mechanical motion detector, and the motion signal has an amplitude proportional to a magnitude and a direction of the detected motion of the reader.

The arrangement also includes a controller operatively connected to the motion sensor, for dynamically controlling at least one of the time periods and the intensity level in real time in response to the motion signal to optimally image the symbol. Preferably, the controller is operative for dynamically decreasing the at least one of the time periods and simultaneously increasing the intensity level of the illumination light. Still another image capture parameter that could be controlled by the controller is the gain of the imager.

Thus, in accordance with this invention, image capture parameter values are not preset, but are dynamically adjusted in real time. A high amount of noise and blur is no longer accepted or tolerated in the image. The brightness and the depth of field of the image is adjusted to be optimal for the particular application. Excessive hand jitter or hand motion by a particular operator is affirmatively taken into account by the motion sensor. Reading performance of symbols, especially those of high density and located far from the reader, is enhanced.

The method of reducing image blur, in response to motion of an imaging reader for imaging symbols to be read, is performed by illuminating a symbol with illumination light having an intensity level over an illumination time period, capturing return light from the symbol over a field of view of a solid-state imager over an exposure time period, detecting the motion of the reader with a motion sensor supported by the reader, generating a motion signal in response to the detected motion of the reader, and dynamically controlling at least one of the time periods and the intensity level in real time in response to the motion signal to optimally image the symbol.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
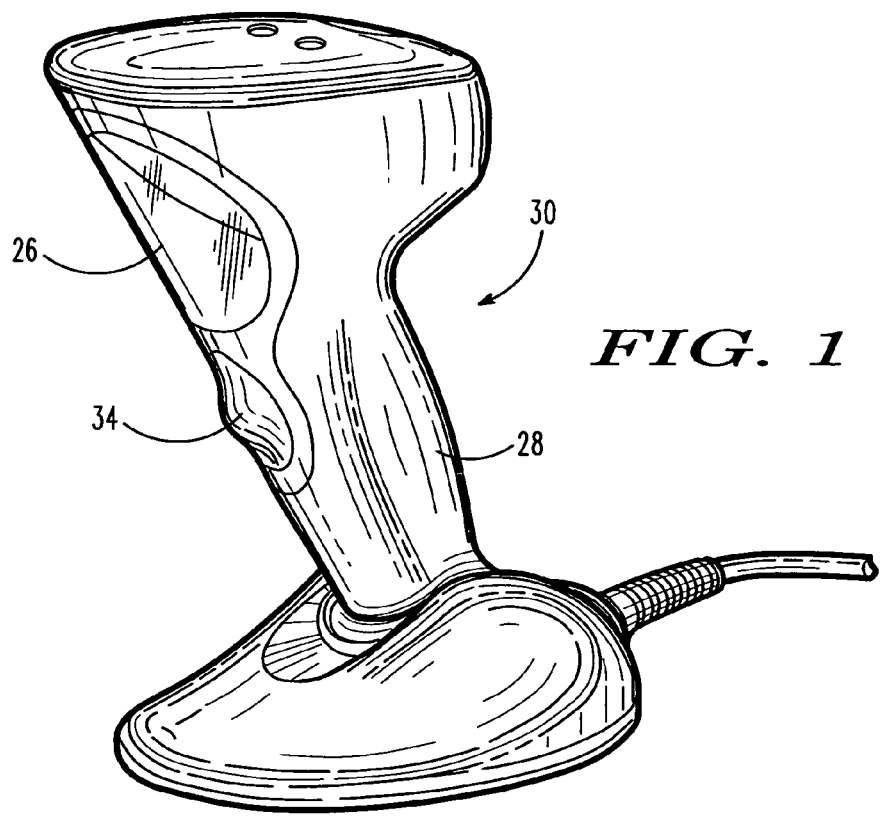
FIG. 1 is a perspective view of a portable imaging reader operative in either a handheld mode, or a hands-free mode, for capturing return light from target symbols.

Reference numeral 30 in FIG. 1 generally identifies an imaging reader having a generally vertical window 26 and a gun-shaped housing 28 supported by a base 32 for supporting the imaging reader 30 on a countertop. The imaging reader 30 can thus be used in a hands-free mode as a stationary workstation in which products are slid, swiped past, or presented to, the vertical window 26, or can be picked up off the countertop and held in an operator's hand and used in a handheld mode in which the reader is moved and a trigger 34 is manually depressed to initiate imaging of indicia, especially one- or two-dimensional symbols, to be read at far distances from the window 26. In another variation, the base 32 can be omitted, and housings of other configurations can be employed. A cable, as illustrated in FIG. 1, connected to the base 32 can also be omitted, in which case, the reader 30 communicates with a remote host by a wireless link, and the reader is electrically powered by an on-board battery.

Figure 2:
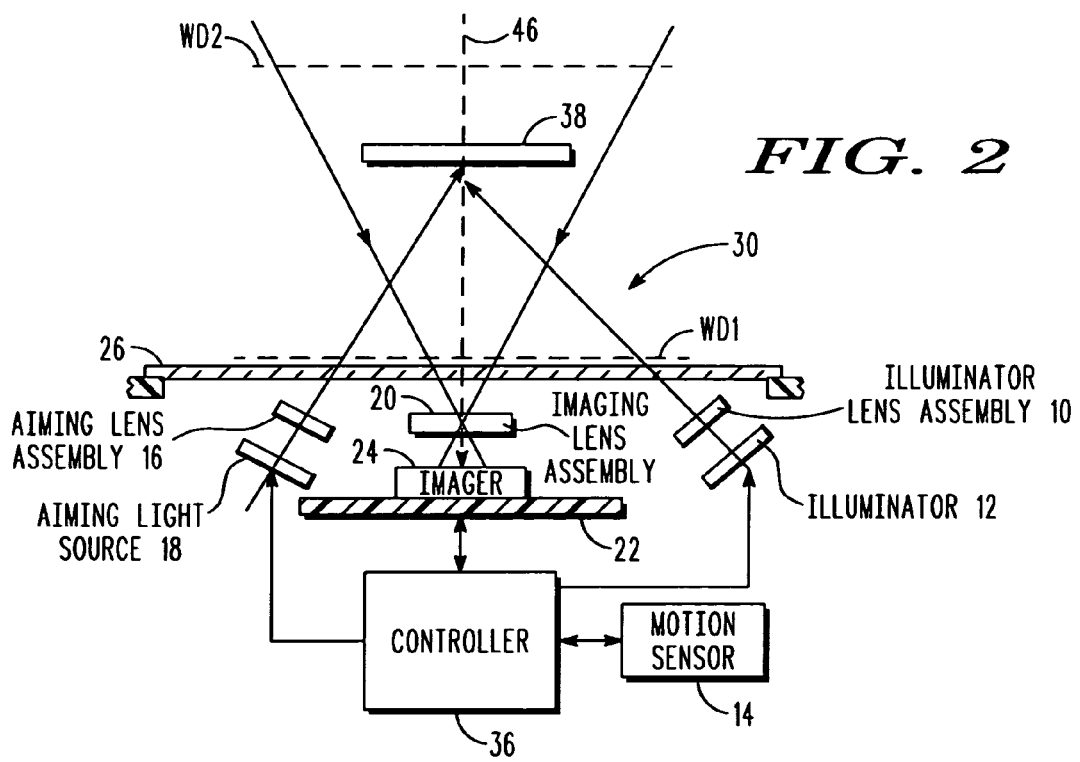
FIG. 2 is a schematic diagram of various components of the reader of FIG. 1 in accordance with this invention.

As schematically shown in FIG. 2, an imager 24 is mounted on a printed circuit board 22 in the reader. The imager 24 is a solid-state device, for example, a CCD or a CMOS imager having a one-dimensional array of addressable image sensors or pixels arranged in a single, linear row, or a two-dimensional array of such sensors arranged in mutually orthogonal rows and columns, and operative for detecting return light captured by an imaging lens assembly 20 along an optical path or axis 46 through the window 26. The return light is scattered and/or reflected from a target or symbol 38 over the field of view. The imager 24 captures the return light over an exposure time period. The imaging lens assembly 20 is operative for adjustably focusing the return light onto the array of image sensors to enable the symbol 38 to be read. The symbol 38 is located anywhere in a working range of distances between a close-in working distance (WD1) and a far-out working distance (WD2). In a preferred embodiment. WD1 is about four to six inches from the imager array 24, and WD2 can be many feet from the window 26, for example, around fifty feet away.

An illuminating assembly is also mounted in the imaging reader and preferably includes an illuminator or illuminating light source 12, e.g., a light emitting diode (LED), and an illuminating lens assembly 10 to uniformly illuminate the symbol 38 with an illuminating light having an intensity level over an illumination time period. The LED 12 is preferably pulsed.

An aiming assembly is also mounted in the imaging reader and preferably includes an aiming light source 18, e.g., an LED, and an aiming lens assembly 16 for generating a visible aiming light pattern on the symbol 38. The aiming pattern is useful to help the operator accurately aim the reader at the symbol 38.

As shown in FIG. 2, the imager 24, the illuminating light source 12 and the aiming light source 18 are operatively connected to a controller or microprocessor 36 operative for controlling the operation of these components, especially one or more of the image capture parameters, such as the intensity level of the illuminating light, the duration of the illumination time period, the duration of the exposure time period, and the gain of the imager 24. Preferably, the microprocessor is the same as the one used for processing the return light from target symbols and for decoding the captured target images.

As also shown in FIG. 2, a motion sensor 14 is operatively connected to the controller 36. The motion sensor 14 is positioned and supported within the reader. The motion sensor 14 may be a gyroscope, an accelerometer, or some other mechanical device that provides an electrical output motion signal proportional to a magnitude and a direction of motion of the reader. As described above, the reader is moved by the operator to aim the reader at the symbol. Also, unavoidable hand jitter of the reader often occurs during image capture. The output motion signal of the motion sensor 14 is conducted to the controller 36, which then dynamically adjusts the image capture parameters in real time. If the motion and the magnitude of the motion signal are high, then the controller 36 calculates that the illumination and exposure time period is proportionately low, that the intensity level of the illumination light is correspondingly high, and that the gain of the imager is correspondingly low. Conversely, if the motion and the magnitude of the motion signal are low, then the controller 36 calculates that the illumination and exposure time period is proportionately high, that the intensity level of the illumination light is correspondingly low, and that the gain of the imager is correspondingly high.

In operation, the controller 36 sends a command signal to energize the aiming light source 18 prior to reading, and also pulses the illuminating light source 12 for the calculated illumination time period, say 500 microseconds or less, and at the calculated intensity level, and energizes and exposes the imager 24 to collect light, e.g., illumination light and/or ambient light, from the symbol only during the calculated exposure time period and with a calculated gain. A typical array needs about 33 milliseconds to acquire the entire target image and operates at a frame rate of about 30 frames per second.

Limiting the exposure time period also minimizes the amount of the captured return light. As a result, the captured image will often appear dark. Yet, for reading bar code symbols, darker images are often easier to decode than blurred ones. Hence, this invention has particular utility for reading bar code symbols.

It will be understood that each of the elements described above, or two or more together, also may find a useful application in other types of constructions differing from the types described above. For example, the illumination light source 12 need not be all LED, but could be a laser, a strobe, a xenon flash lamp, or another type of light source. Also, there need not be a single source, but a plurality of sources is contemplated, in which case, any of the number, intensity, duration and timing of one or more of the sources could be controlled by the controller 36.

While the invention has been illustrated and described as an arrangement for, and a method of, controlling image capture parameters in response to motion of an imaging reader, it is not intended to be limited to the details shown, since various modifications and structural changes may be made without departing in any way from the spirit of the present invention. For example, rather than hardwiring the motion sensor 14 to the controller, a software solution might be implemented. Also, this invention is not to be limited solely to imaging readers whose only function is to image bar code symbols, but could equally apply to mobile computers or terminals having an imager as one of its subsystems.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for reducing image blur in response to motion of an imaging reader for imaging symbols to be read, comprising:
    an illuminating light assembly supported by the reader for illuminating a symbol with illumination light having an intensity level over an illumination time period;
    a solid-state imager supported by the reader and having an array of image sensors for capturing return light from the symbol over a field of view over an exposure time period;
    a motion sensor supported by the reader for detecting the motion of the reader, and for generating a motion signal in response to the detected motion of the reader; and
    a controller operatively connected to the motion sensor, for dynamically controlling at least one of the exposure time period, the illumination time periods, and the intensity level in real time in response to the motion signal to reduce image blur due to the motion of the reader.

2. The arrangement of claim 1, wherein the motion sensor is one of an accelerometer and a gyroscope, and wherein the motion signal has an amplitude proportional to a magnitude and a direction of the detected motion of the reader.

3. The arrangement of claim 1, wherein the controller is operative for dynamically decreasing the at least one of the exposure time period and the illumination time period, and simultaneously increasing the intensity level of the illumination light.

4. The arrangement of claim 1, wherein the illuminating light assembly includes a light emitting diode (LED) for emitting the illumination light as a light pulse.

5. The arrangement of claim 1, wherein the imaging reader includes a vertical window and a gun-shaped housing supported by a base for supporting the imaging reader.

6. An imaging reader for electro-optically reading a symbol by image capture, comprising:
    a mobile handheld housing; and
    an arrangement supported by the housing, for reducing image blur in response to motion of the handheld housing during the image capture, the arrangement including an illuminating light assembly supported by the handheld housing for illuminating the symbol with illumination light having an intensity level over an illumination time period, a solid-state imager supported by the handheld housing and having an array of image sensors for capturing return light from the symbol over a field of view over an exposure time period, a motion sensor supported by the handheld housing for detecting the motion of the handheld housing, and for generating a motion signal in response to the detected motion of the housing, and a controller operatively connected to the motion sensor, for dynamically controlling at least one of the exposure time period, illumination time period, and the intensity level in real time in response to the motion signal to reduce image blur due to the motion of the reader.

7. The reader of claim 6, wherein the motion sensor is one of an accelerometer and a gyroscope, and wherein the motion signal has an amplitude proportional to a magnitude and a direction of the detected motion of the handheld housing.

8. The reader of claim 6, wherein the controller is operative for dynamically decreasing the at least one of the exposure time period and illumination time period, and simultaneously increasing the intensity level of the illumination light.

9. The reader of claim 6, wherein the illuminating light assembly includes a light emitting diode (LED) for emitting the illumination light as a light pulse.

10. The reader of claim 6, wherein the mobile handheld housing is gun-shaped.

11. A method of reducing image blur in response to motion of an imaging reader for imaging symbols to be read, comprising the steps of:
    illuminating a symbol with illumination light having an intensity level over an illumination time period;
    capturing return light from the symbol over a field of view of a solid-state imager over an exposure time period;
    detecting the motion of the reader with a motion sensor supported by the reader, and generating a motion signal in response to the detected motion of the reader; and
    dynamically controlling at least one of the exposure time period, illumination time period and the intensity level in real time in response to the motion signal to reduce image blur due to the motion of the reader.

12. The method of claim 11, and configuring the motion sensor as one of an accelerometer and a gyroscope, and configuring the motion signal with an amplitude proportional to a magnitude and a direction of the detected motion of the reader.

13. The method of claim 11, wherein the controlling step is performed by dynamically decreasing the at least one of the exposure time period and illumination time period, and simultaneously increasing the intensity level of the illumination light.

14. The method of claim 11, wherein the illuminating step is performed by pulsing a light emitting diode (LED).

* * * * *

UNITED STATES PATENT AND TRADEMARK OFFICE
CERTIFICATE OF CORRECTION

PATENT NO.        : 8,056,808 B2
APPLICATION NO.   : 12/286079
DATED             : November 15, 2011
INVENTOR(S)       : Epshteyn Page 1 of 1

It is certified that error appears in the above-identified patent and that said Letters Patent is hereby corrected as shown below:

In Column 5, Line 5, delete "all" and insert -- an --, therefor.

Signed and Sealed this
First Day of January, 2013

David J. Kappos
*Director of the United States Patent and Trademark Office*